(No Model.)

H. W. SIMMS.
SHADE ROLLER FIXTURE.

No. 420,418. Patented Jan. 28, 1890.

ATTEST:
G. P. Thomas
C. J. McInerney

INVENTOR:
Henry W. Simms.
By Jass E. Thomas
Atty.

UNITED STATES PATENT OFFICE.

HENRY W. SIMMS, OF BAY CITY, MICHIGAN.

SHADE-ROLLER FIXTURE.

SPECIFICATION forming part of Letters Patent No. 420,418, dated January 28, 1890.

Application filed December 4, 1888. Serial No. 292,657. (No model.)

*To all whom it may concern:*

Be it known that I, HENRY W. SIMMS, a citizen of the United States, residing at Bay City, in the county of Bay and State of Michigan, have invented certain new and useful Improvements in Shade-Roller Fixtures; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to shade-roller fixtures of the class in which an actuating-spring is used as the power for revolving the roller for winding the shade thereon, and in which a slotted supporting-bracket provided with a lifting-spring for supporting the roller-end devices for engaging with the roller to retain the same in position is used for supporting the roller in position upon the window.

The invention pertains especially to improvements in the supporting and locking devices for retaining the roller against revolution, or to allow the roller to be revolved as desired by the operator; and the invention consists in the combination, especially in the location and arrangement, of the several elements which are used in the construction of the improved device, all of which I hereinafter fully describe, and point out in the claims.

The object of this invention is to so arrange and construct a shade-roller-locking device which will be more easily manipulated when in operation, and which may be operated without jar or undue friction or rattling or clicking noise and that will retain the shade in any position it may be in when released by the operator. I attain these objects by the devices illustrated in the accompanying drawings, in which—

Figure 2:
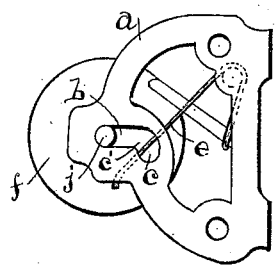
Figure 3:
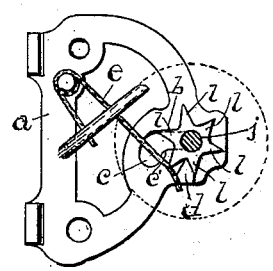
Figure 4:
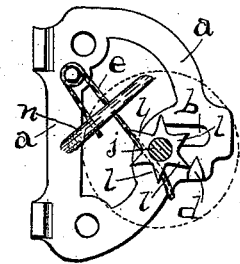
Figure 5:
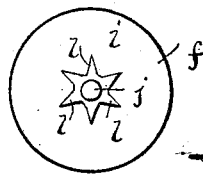
Figure 1:
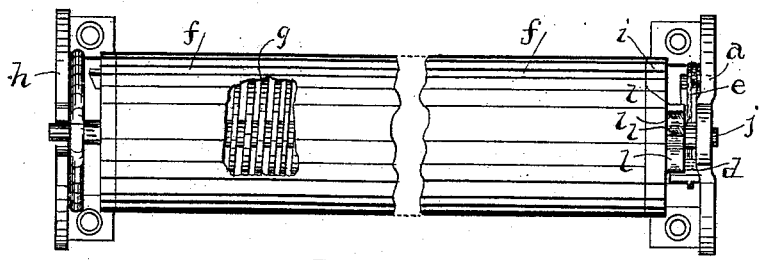

Figure 1 represents a front view of a shade-roller containing my improvement. Fig. 2 is an end view of the same, showing the outside of the supporting-bracket with the roller locked in position. Fig. 3 is a view of the inner side of the bracket with section of end portion of the roller in the position shown in Fig. 2. Fig. 4 is the same as shown in Fig. 3, but in the position for operating the shade or unlocked. Fig. 5 is an end view of the roller detached.

$a$ represents a supporting-bracket, which is secured in the usual manner to the window-casing and extending outwardly therefrom, and is provided on its outer end with a horizontal slot $b$, having its inner end $c$ curved downwardly, and below the slot on the inner side of the bracket is arranged an inwardly-projecting lug $d$. This lug $d$ is preferably situated somewhat in the rear of the front end of the slot, and $e$ is a spring which is mounted upon or secured to the bracket in any suitable manner, as by an arm or guide $n$ in rear of the slot, with its free end reaching across the curved portion $c$ thereof and resting against the rear or under side of the lug $d$.

$f$ is the shade-roller, provided in one end with an inclosed actuating-spring $g$, which revolves the roller for winding the shade thereon, and is supported at this end by a bracket $h$, and the opposite end of the roller is provided with a cap-piece $i$, secured thereto, with a roller-journal $j$ projecting outwardly from the center of the cap-piece, and rests in the slot $b$ for supporting this end of the roller. Around the journal $j$, on the portion between the bracket and the cap-piece, are arranged radial teeth $l$, of a suitable number and size to engage with the lug $d$ when the roller-journal is resting in the front end of the slot $b$, but, however, to become disengaged therefrom when the roller-journal is moved to the curved or rear portion of the slot.

The shade is secured to the roller in the usual manner, so that the pendent portion thereof hangs from the inner side of the roller, the actuating-spring of course revolving the upper side of the roller forwardly, and one of the teeth $l$, engaging with the front side of the lug $d$, then forces the journal $j$ against the front end of the slot $b$, which securely locks the roller against further revolution. As the shade is drawn downward, the next tooth in rear engages with the rear side of the lug $g$, and the journal $j$ then moves in the slot to the rear and against the spring $e$, which, recoiling, permits the journal to pass into the downwardly-curved portion $c$ of the slot, the engagement of the tooth $l$ with the lug being freed as the journal passes over the curve $c'$, where the downward pull upon the shade operates to move the journal into the inner end $c$ and to retain the same in that position so long as sufficient downward force is exerted upon the shade to compensate for the lifting action of the spring $e$, so that the shade may be raised or lowered to any desired position while the roller-journal is resting in the end $c$ of the slot, and when the desired position for the shade is reached it is released from the force exerted downwardly thereon, and the spring $e$ then raises the journal over the curve $c'$ and brings one of the teeth $l$ into engagement with the lug $d$, and the action of the actuating-spring upon the roller then forces the journal to the forward end of the slot, and the parts are then locked in position.

One of the great advantages of the construction and arrangement of my improvement is that the locking action is more reliable and positive than when the lifting-spring is alone depended upon to bring the parts into engagement, as the rolling action of the teeth $l$ makes an easy, sure, and positive engagement with the lug, which, being located upon the side of the slot, prevents any recoil of the lifting-spring from effecting the engagement, as the journal is held against the upper, or side of the slot opposite the lug, so that whenever a tooth engages with the lug in the least degree it is at once brought into full engagement by the forward movement of the journal in the slot without noise or rattling. By arranging the slot with a curve $c'$ the roller-journal is held easily in position by the operator to allow the teeth to pass the lug without engagement and permit a proper manipulation of the shade, the spring $e$ being merely of sufficient strength or tension to lift the journal over the curve as the shade is released.

I have shown and described the slot $c$ as being preferably horizontal; but the precise form of the slot is not, however, deemed important so long as the relative position of the lug $d$ to the slot is retained, so that as one of the teeth engages with the lug $d$ the roller-journal may freely move forward to effect a full engagement of the tooth with the lug, the location of the lug in relation to the slot to allow the roller-journal to move beyond the lug being the most essential feature of the invention.

What I claim as my invention, and desire to secure by Letters Patent, is—

In a shade-roller fixture, the combination of the shade-roller having an inclosed actuating-spring and provided on its end with a journal having on its inner portion the radial teeth $l$, the supporting-bracket provided with a slot $b$, having in one end the curve $c'$ and the depressed portion $c$ and carrying the roller-journal, a spring $e$ for raising the roller-journal out of the said portion $c$ of the slot when the shade is released, and a lug $d$, projecting inwardly from the portion of the bracket on one side of the said slot and engaging with the said radial teeth when the roller-journal is in the central portion of the slot, whereby the roller-journal is forced to the end of the slot by the action of the said actuating-spring, substantially as and for the purpose set forth.

In testimony whereof I affix my signature in presence of two witnesses.

HENRY W. SIMMS.

Witnesses:
GEORGE P. THOMAS,
JAS. E. THOMAS.